(12) United States Patent
Yun et al.

(10) Patent No.: US 9,128,325 B2
(45) Date of Patent: Sep. 8, 2015

(54) DISPLAY DEVICE WITH A GROUND ELECTRODE PHYSICALLY CONTACTING A RECEPTACLE MADE OF AN INSULATING MATERIAL

(75) Inventors: Su-Young Yun, Asan-si (KR);
Young-Ho Lee, Suwon-si (KR);
Jae-Hwan Chun, Suwon-si (KR);
Young-Nam Kim, Asan-si (KR)

(73) Assignee: Samsung Display Co., Ltd. (KR)

( * ) Notice: Subject to any disclaimer, the term of this patent is extended or adjusted under 35 U.S.C. 154(b) by 1357 days.

(21) Appl. No.: 12/605,918

(22) Filed: Oct. 26, 2009

(65) Prior Publication Data

US 2010/0182768 A1   Jul. 22, 2010

(30) Foreign Application Priority Data

Jan. 22, 2009   (KR) ........................ 10-2009-0005675

(51) Int. Cl.
*G09F 13/04* (2006.01)
*G09F 13/08* (2006.01)
*G02F 1/1335* (2006.01)
*H01R 9/03* (2006.01)
*H01R 13/655* (2006.01)

(52) U.S. Cl.
CPC .......... *G02F 1/133604* (2013.01); *H01R 9/034* (2013.01); *G02F 2001/133612* (2013.01); *H01R 13/655* (2013.01)

(58) Field of Classification Search
CPC .............. G02F 1/133604; G02F 2001/133612; H01R 9/034

USPC ........ 362/97.1, 249.01, 97.2, 97.3, 97.4, 221, 362/225, 217.08, 217.01; 349/58
See application file for complete search history.

(56) References Cited

U.S. PATENT DOCUMENTS

| 6,587,355 | B2* | 7/2003 | Park et al. | 361/799 |
| 6,891,582 | B2* | 5/2005 | Hwang | 349/58 |
| 7,612,490 | B2* | 11/2009 | Kubota et al. | 313/112 |
| 2002/0159001 | A1* | 10/2002 | Kim | 349/58 |
| 2005/0017620 | A1* | 1/2005 | Kim et al. | 313/112 |
| 2007/0076396 | A1* | 4/2007 | Kim | 361/796 |
| 2008/0084696 | A1* | 4/2008 | Yang et al. | 362/249 |
| 2008/0180947 | A1* | 7/2008 | Jang et al. | 362/225 |
| 2009/0109369 | A1* | 4/2009 | Morishita | 349/58 |
| 2009/0273726 | A1* | 11/2009 | Choi | 349/58 |

FOREIGN PATENT DOCUMENTS

| KR | 10-1999-0083415 A | 11/1999 |
| KR | 10-0380114 | 4/2003 |
| KR | 1020080012693 A | 2/2008 |
| KR | 10-2008-0032284 A | 4/2008 |
| KR | 10-2008-0032286 A | 4/2008 |
| KR | 1020080032286 A | 4/2008 |
| KR | 1020080041342 A | 5/2008 |

* cited by examiner

*Primary Examiner* — Mary Ellen Bowman
*Assistant Examiner* — Tsion Tumebo
(74) *Attorney, Agent, or Firm* — Innovation Counsel LLP (57) ABSTRACT

A display device has light sources located in a receptacle, where a lower interior walls part of the receptacle is formed of an electrically insulating material. The device includes a vertically extending grounding electrode extending to and physically affixed at one end to the interior walls part of the receptacle. This allows the light sources to be easily grounded by means of the grounding electrode.

20 Claims, 13 Drawing Sheets

DISPLAY DEVICE WITH A GROUND ELECTRODE PHYSICALLY CONTACTING A RECEPTACLE MADE OF AN INSULATING MATERIAL

CROSS-REFERENCE TO RELATED APPLICATION

This application is based on and claims priority from Korean Patent Application No. 10-2009-0005675, filed on Jan. 22, 2009, in the Korean Intellectual Property Office, the disclosure of which is incorporated herein in its entirety by reference.

BACKGROUND OF THE INVENTION

1. Field of the Invention

The present invention relates to a display device, and more particularly to a display device with grounded light sources positioned in a receptacle formed of an insulating material.

2. Description of the Prior Art

A display device (LCD), which is one of the most widely used types of flat panel displays (FPDs), includes a display panel having two substrates on which electrodes are formed, and having a liquid crystal layer interposed between the two substrates. In such a display device, liquid crystal molecules of the liquid crystal layer are rearranged in accordance with voltages being applied to the electrodes, and thus the amount of light passing through the liquid crystal layer is adjusted to display an image.

Since the display device itself is non-radiative, it can be provided with a backlight assembly including a light source used as a luminous element in displaying an image. The backlight assembly emits light from the rear of the display panel, and operates as a surface light source uniformly illuminating the whole display panel. Such backlight assemblies are classified into a direct downward type backlight assembly and an edge type backlight assembly in accordance with the position of the light source.

Recently, has attempts have been made to develop a display device with components having simple construction so as to facilitate manufacturing of the display device and reduce the manufacturing cost.

Particularly, in order to achieve efficient assembly and to reduce the manufacturing cost, it is desired to simplify the structure of the upper receptacle, the intermediate frame, and the lower receptacle which form the frame of the display device and accommodate various kinds of components therein.

Accordingly, a molding method has been developed to form the lower receptacle for accommodating components such as light sources, a diffusion plate, and the like. The lower receptacle is made by molding from an insulating material. Therefore, the electrically insulative lower receptacle cannot by itself serve as a grounding structure for providing grounding to the light sources.

SUMMARY

Some embodiments of the present invention meet the above-mentioned needs, and provide a display device in which light sources received in a receptacle formed of an insulating material can be easily grounded.

Additional advantages, objects, and features of the present disclosure of invention are set forth below.

Some embodiments provide a display device comprising: a display panel to display an image; one or more light sources to provide light to the display panel; a lower receptacle formed of an insulating material and including a bottom part and side-wall parts surrounding the bottom part; an upper receptacle coupled to the lower receptacle, the upper and lower receptacles containing therebetween the display panel and the light sources; and a ground electrode physically contacting the lower receptacles and electrically connected to each said light source.

DETAILED DESCRIPTION OF SOME EMBODIMENTS

Some embodiments in accordance with the present disclosure of invention will now be described in detail with reference to the accompanying drawings. However, the present disclosure of invention is not limited to such embodiments, but can be implemented in diverse forms.

The same drawing reference numerals are used for the same elements across the figures.

Spatially relative terms such as "below", "beneath", "lower", "above", "upper", and so forth, may be used to facilitate the description of relationships between elements as illustrated in the drawings. The spatially relative terms are not intended to limit the elements to the particular spatial orientation illustrated in the drawings, and other spatial relationships are possible in use or operation of embodiments of the invention.

Figure 1:
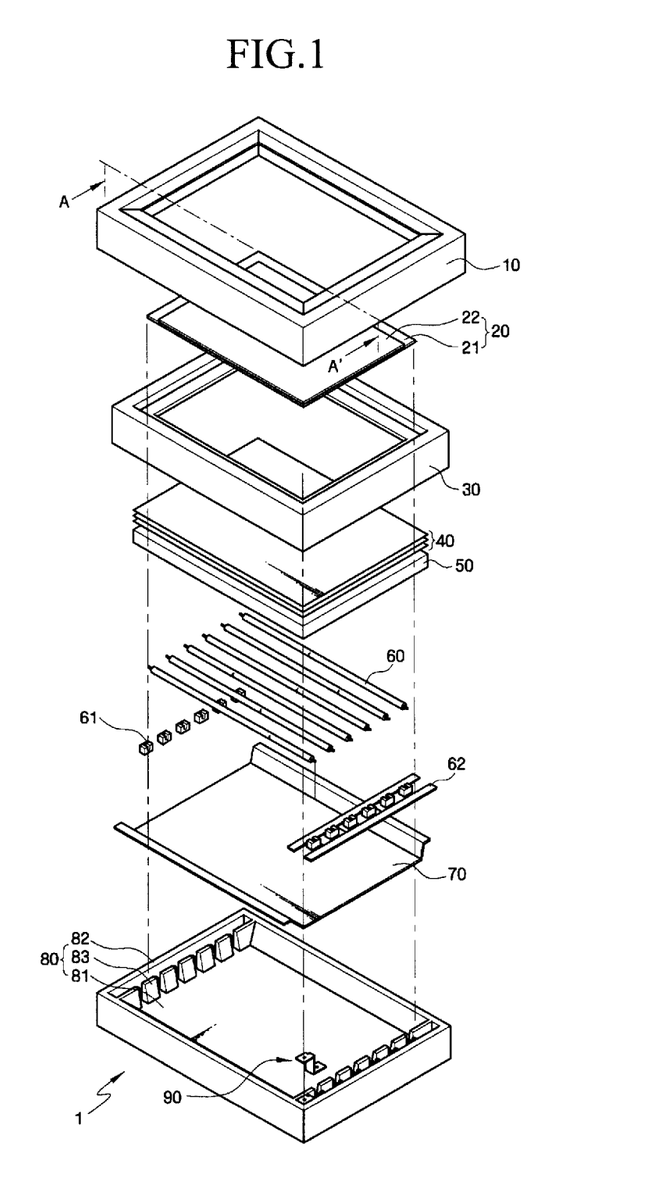
FIG. 1 is an exploded perspective view of a display device according to a first embodiment of the present invention.
Figure 2:
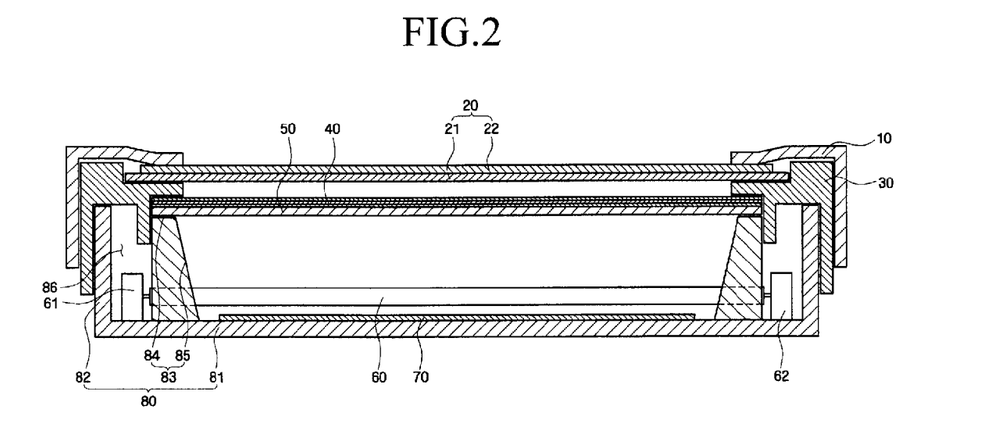
FIG. 2 is a sectional view of the display device, taken along line A-A' of FIG. 1.
Figure 3:
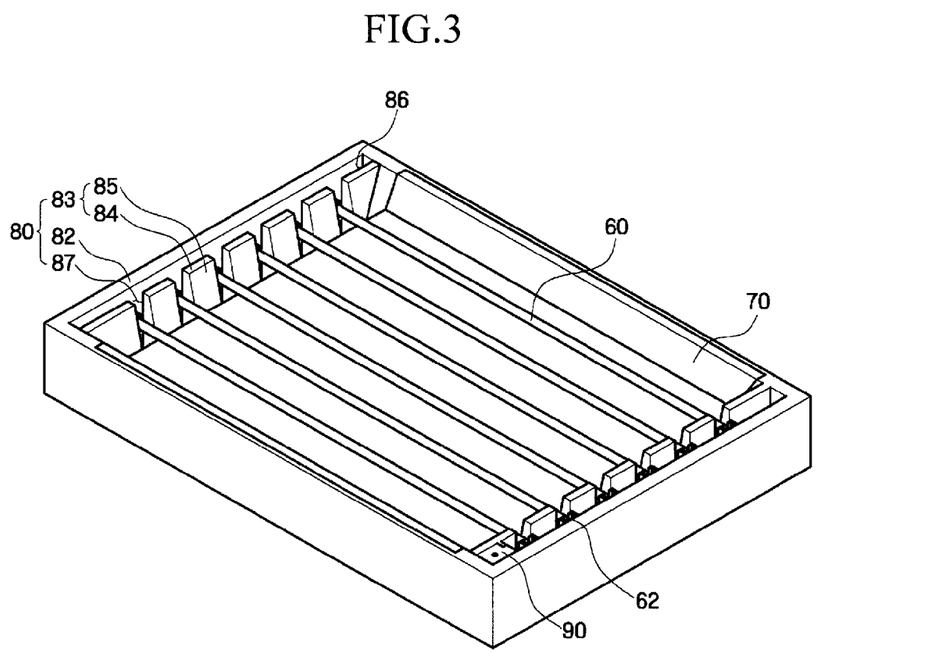
FIG. 3 is a perspective view of a lower receptacle, light sources, and a ground electrode included in the display device of FIG. 1.
Figure 4:
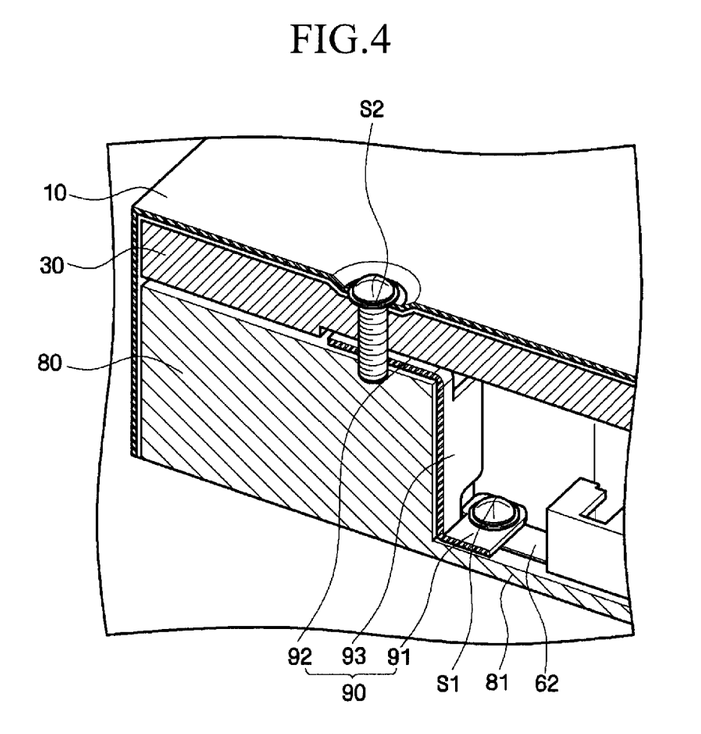
FIG. 4 is a perspective view of a cross-sectional part of the display device of FIG. 1.
Figure 5:
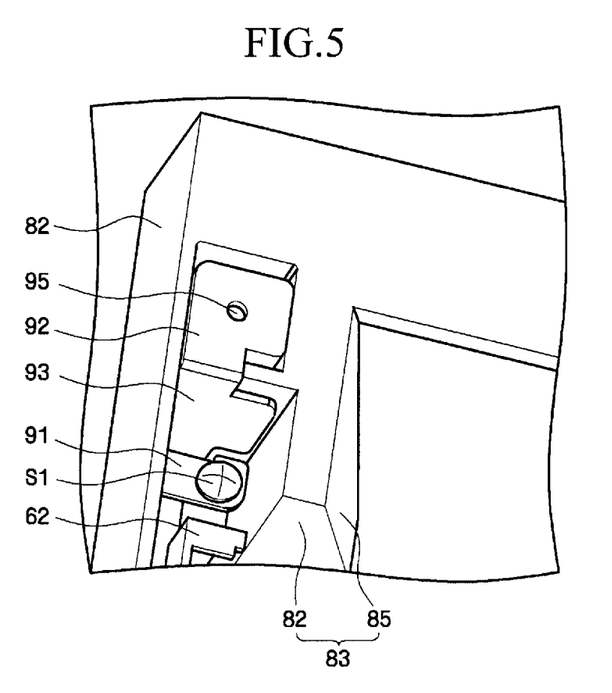
FIG. 5 is a partial perspective view of a lower receptacle having a ground electrode coupled thereto.
Figure 6:
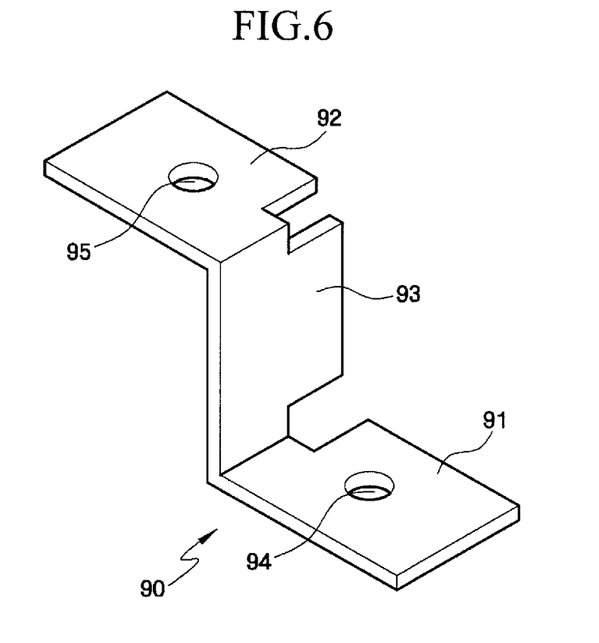
FIG. 6 is a perspective view of a ground electrode included in the display device of FIG. 1.

FIGS. 1 to 6 illustrate a display device according to a first embodiment of the present invention. FIG. 1 is an exploded perspective view of the display device, FIG. 2 is a sectional view of the display device, taken along line A-A' of FIG. 1, and FIG. 3 is a perspective view of a lower receptacle, light sources, and a ground electrode in the display device of FIG. 1. FIG. 4 is a perspective view of a cross-sectional part of the display device of FIG. 1, FIG. 5 is a partial perspective view of the lower receptacle having the ground electrode coupled thereto, and FIG. 6 is a perspective view of the ground electrode included in the display device of FIG. 1.

Referring to FIGS. 1 and 2, the display device 1 includes a display panel 20, an upper receptacle 10, light sources 60, a diffusion plate 50, an optical sheet 40, a reflection sheet 70, an intermediate frame 30, and a lower receptacle 80.

The display panel 20 displays images thereon, and includes a lower substrate 21, an upper substrate 22, and a liquid crystal layer (not illustrated) interposed between the two substrates 21 and 22.

The lower substrate 21 includes gate lines (not illustrated), data lines (not illustrated), a thin film transistor array, pixel electrodes, and the like, and the upper substrate 22 includes color filters, black matrices, common electrodes, and the like. Alternatively, the color filters, the common electrodes, and the like may be formed on the lower substrate 21.

In operation, the human viewer faces the upper receptacle 10, which has a space therein to receive the display panel 20. The center part of the upper receptacle 10 includes an open window exposing the display panel 20 to the viewer.

The upper receptacle 10 is coupled to the lower receptacle 80 to contain therebetween the display panel 20, the optical sheet 40, the diffusion plate 50, the reflection sheet 70, and the light sources 60. The display panel 20 is placed on the intermediate frame 30 positioned between the upper receptacle 10 and the lower receptacle 80.

Each light source 60 may be a line light source such as a cold cathode fluorescent lamp (CCFL), a hot cathode fluorescent lamp (HCFL), an external electrode fluorescent lamp (EEFL), and the like. Alternatively, some or all of the light sources 60 may include one or more light emitting diodes (LEDs). The light sources 60 may be successively arranged at predetermined intervals on a printed circuit board.

As illustrated in FIG. 2, the light sources 60 may be arranged directly below the display panel 20 in parallel to the surface of the display panel 20. The structure in which the light sources 60 are arranged on directly below the display panel 20 is called a direct downward type structure. In the following description of the present embodiment, fluorescent lamps are used as exemplary light sources.

Lamp sockets 61 are arranged on one side of the lamps 60, and ground sockets 62 are arranged on the opposite side of the lamps 60. Each lamp 60 includes, on its opposite sides, terminals one of which physically contacts the respective lamp socket 61 and the other one of which physically contacts the respective ground socket 62. The ground sockets 62 and the lamp sockets 61 deliver power to the lamps 60.

The ground sockets 62 are electrically connected together. The ground sockets 62 may be provided as separate units formed by suitably shaped conductive plates, or may be integrally formed as one body. They may be commonly connected to the same power supply.

The lamp sockets 61 may be insulated from each other. The lamp sockets 61 are connected to respective inverters (not illustrated) to receive drive voltages from the inverters. The inverters (not illustrated) may be formed on the outside of the lower receptacle 80.

The diffusion plate 50 is arranged above the lamps 60, and diffuses light emitted from the lamps 60. The diffusion plate 50 improves the luminance uniformity of the lamps 60.

In order to provide uniform luminance, the diffusion plate 50 may be formed by dispersing a diffusion material in a transparent resin plate. The transparent resin plate may be made, for example, of acryl or polycarbonate, and the diffusion material may be particles of cross-linked polymethyl-methacrylate, cross-linked polystyrene, cross-linked sodium polyacrylate, cross-linked silicon, cross-linked acryl-styrene copolymer, calcium carbonate, barium sulfate, and the like. The invention is not limited to either the composition of the transparent resin plate or of the diffusion material.

The diffusion plate 50 is formed with a specified thickness, and thus has sufficient stiffness to support the optical sheet 40.

The optical sheet 40 is installed on top of the diffusion plate 50, to diffuse and condense light emerging from the diffusion plate 50.

The optical sheet 40 may include one or more of a diffusion sheet, a prism sheet, and a protection sheet, or alternatively the functions of such sheets can be provided by a single sheet. For example, the optical sheet 40 may formed as a single sheet having a lower part functioning as a diffusion sheet, having a prism pattern (not illustrated) on the lower part to function as a prism sheet, and having a protection layer (not illustrated) formed on the prism pattern. Such optical sheet 40 performs both the diffusion function and the prism function, and therefore the number of components of the display device can be reduced to obtain a slim display device.

The reflection sheet 70 is arranged below the lamps 60 and the diffusion plate 50. Light emitted downward by the lamps 60 is reflected upward by the reflection sheet 70 to reach the display panel 20 above the lamps 60. The light efficiency is therefore improved.

The reflection sheet 70 may be prepared for example by dispersing white pigment such as titanium oxide on a sheet of synthetic resin, and forming light-scattering bubbles on the synthetic resin sheet. The reflection sheet 70 does not have to be a separate sheet inserted below the lamps, but may be formed by depositing reflective material onto the lower receptacle 80.

Referring to FIG. 3, the lower receptacle 80 includes side-wall parts 82, inner-wall parts 83, and a bottom part 81. Specifically, the lower receptacle 80 includes four side-wall parts 82 formed along the edge of the lower receptacle. The lower portions of the four side-wall parts 82 are connected together by the bottom part 81. A receiving space is formed by the bottom part 81 and the four side-wall parts 82 extending from the bottom part 81.

The lower receptacle 80 includes the inner-wall parts 83 provided inside the side-wall parts 82. The inner-wall parts 83 prevent non-luminous regions of the lamps 60 from being visually recognized on the display panel 20. Each inner-wall part 83 includes an upper surface 84 and an inclined surface 85. Specifically, the opposite ends of the lamps 60 are connected to the lamp sockets 61 and the ground sockets 62, respectively. Since the lamp sockets 61 and the ground sockets 62 at the ends of the lamps 60 are non-luminous regions, they may be visually recognized as dark areas if they are exposed to the display panel 20 together with the lamps 60. Accordingly, it is desirable not to directly expose such non-luminous regions to the display panel 20.

The inner-wall parts 83 can minimize the visibility, on the display panel 20, of the lamp sockets 61 and the ground sockets 62 at the ends of the lamps 60. In other words, the inner-wall parts 83 can minimize the exposure of the non-luminous regions to the display panel 20. The inner-wall parts 83 are formed inwardly relative to the side-wall parts 82 in parallel to the side-wall parts 82. It is not necessary to form the inner-wall parts 83 at all the four side-wall parts 82, and the inner-wall parts 83 may be formed to face each other along the two side-wall parts 82 at the opposite ends of the lamps 60.

The adjacent inner-wall parts 83 may be spaced from each other. Thus, in some embodiments, the inner-wall parts 83 are arranged at predetermined intervals defined by lamp insertion grooves 87 in which the lamps 60 are inserted. It is preferable to minimize the width of the lamp insertion groove 87. The width of the lamp insertion groove 87 may be set to be somewhat larger than the diameter of the lamp 60.

A reflective material may be spread on the upper surface 84 and the inclined surface 85 of the inner-wall part 83, and the lower receptacle 80 may be formed to have a white, highly-reflective color.

The ground sockets 62 and the lamp sockets 61 are arranged in socket insertion grooves 86 formed between the side-wall parts 82 and the inner-wall parts 83. Since the ground sockets 62 and the lamp sockets 61 are arranged in the socket insertion grooves 86, the visual recognition of the lamp sockets 61 and the ground sockets 62 at the ends of the lamps 60 can be prevented.

FIGS. 4 to 6 illustrate a ground electrode 90. Referring to FIGS. 4 and 5, the ground electrode 90 is connected to one end of the ground assembly consisting of the ground sockets 62, and serves to apply a ground voltage to the ground sockets 62. A display device having a lower receptacle 80 formed of metal or some other conductive material might not need a ground electrode 90 because the ground sockets 62 could be to made in physical contact with the lower receptacle and could receive the ground voltage through the lower receptacle. However, if the lower receptacle 80 is made of an insulating material (as in some embodiments of the present invention), a separate ground electrode 90 is desirable for applying the ground voltage to the ground sockets 62.

In the embodiment being described, the ground electrode 90 is connected between the conductive upper receptacle 10 and the ground sockets 62 to apply the ground voltage to the lamps 60.

Referring to FIG. 6, the ground electrode 90 includes a first horizontal part 91, a second horizontal part 92, and a vertical part 93. The first horizontal part 91 and the second horizontal part 92 are parallel to each other, and the vertical part 93 is connected between the first horizontal part 91 and the second horizontal part 92. The first horizontal part 91, the second horizontal part 92, and the vertical part 93 may be formed of a conductor, and, for example, may be formed integrally with each other as a single, suitably bent metal plate. The first horizontal part 91 and the second horizontal part 92 are perpendicular to the vertical part 93.

A first fixing hole 94 and a second fixing hole 95 are formed on the first horizontal part 91 and the second horizontal part 92, respectively, and are used to affix the first horizontal part 91 and the second horizontal part 92 to the lower receptacle 80 and the upper receptacle 10.

Referring again to FIGS. 4 and 5, the first horizontal part 91 of the ground electrode 90 is fixed to the bottom part 81 of the lower receptacle 80. The ground electrode 90 is affixed to the lower receptacle by a screw S1 through the first fixing hole 94 formed in the first horizontal part 91. In this embodiment, the first horizontal part 91 is in physical contact with the ground assembly of the ground sockets 62, and thus is electrically connected to the ground sockets 62. More particularly, the screw S1 passes through, and fastens together, the first horizontal part 91, the bottom part 81 of the lower receptacle 80, and one end of the ground assembly of the ground sockets 62. In this manner, the ground electrode 90 is physically and electrically connected to the ground sockets 62.

The second horizontal part 92 is affixed to the upper receptacle 10, the intermediate frame 30, and the lower receptacle 80 by a screw S2. The screw S2 penetrates the upper receptacle 10, the intermediate frame 30, the second horizontal part 92, and the lower receptacle 80, in that order. In this manner, the upper receptacle 10 and the ground electrode 90 are electrically connected together by the screw S2. The ground electrode 90 may be formed on one side of the lower receptacle 80.

The screw S2 for fastening together the upper receptacle 10, the intermediate frame 30, the ground electrode 90, and the lower receptacle 80 can be automatically put in place by an automation device.

Figure 7:
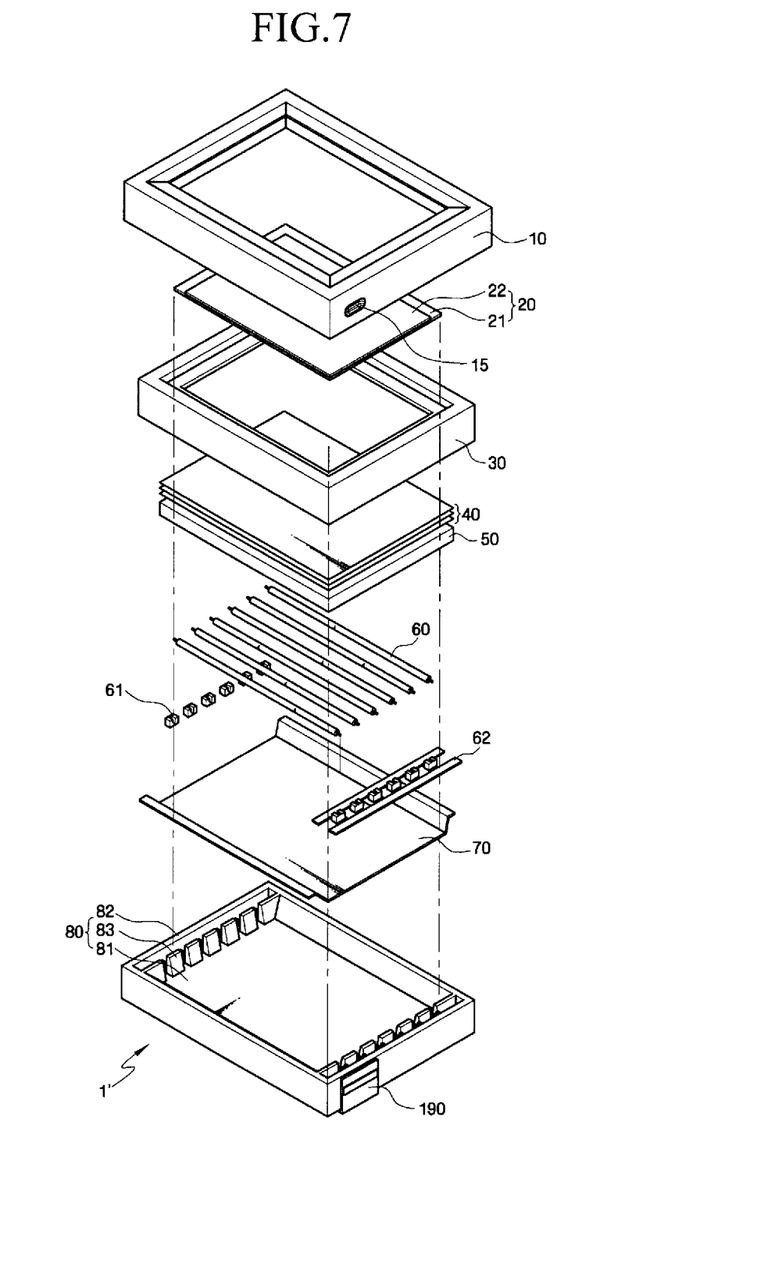
FIG. 7 is an exploded perspective view of a display device according to a second embodiment of the present invention.
Figure 8:
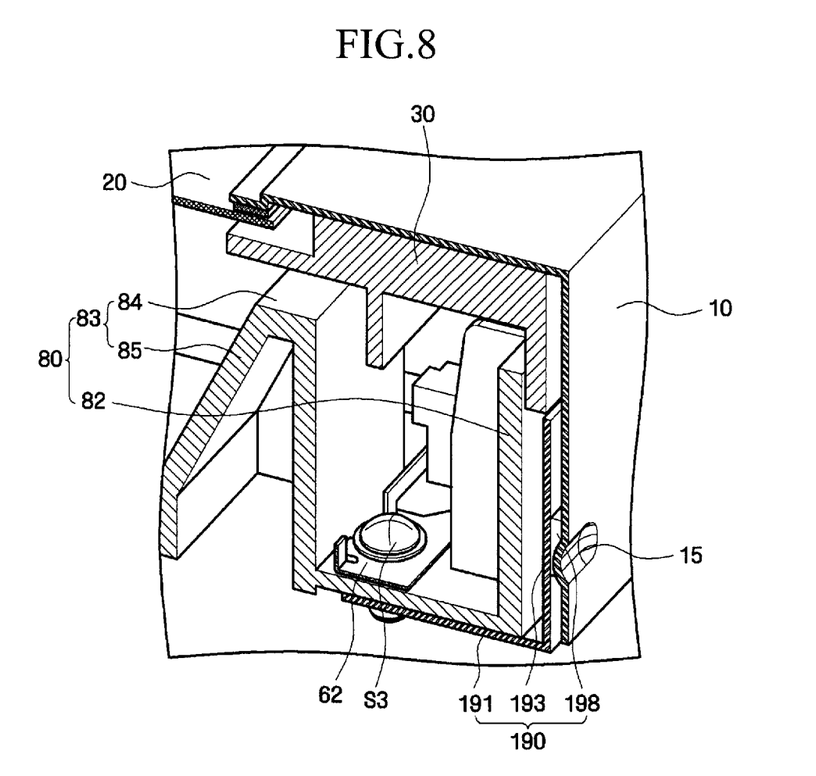
FIG. 8 is a perspective view of a cross-sectional part of the display device of FIG. 7.
Figure 9:
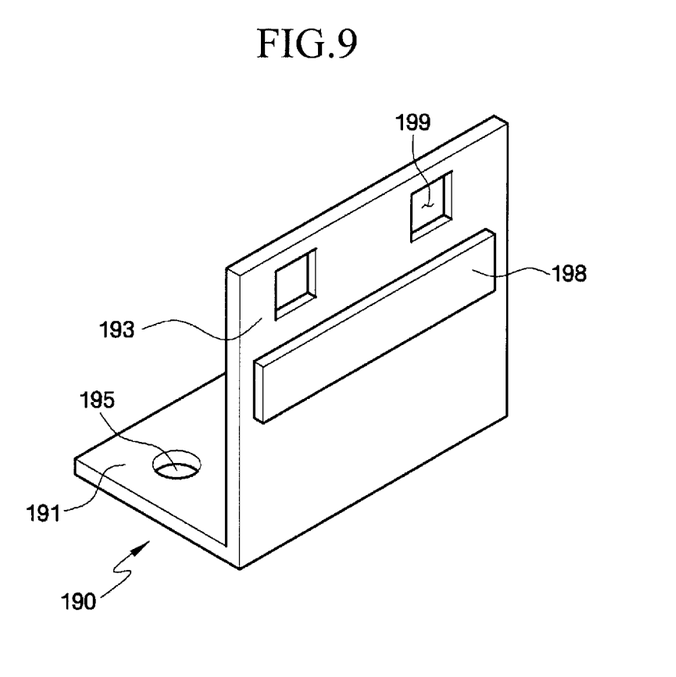
FIG. 9 is a perspective view of a ground electrode included in the display device of FIG. 7.
Figure 10:
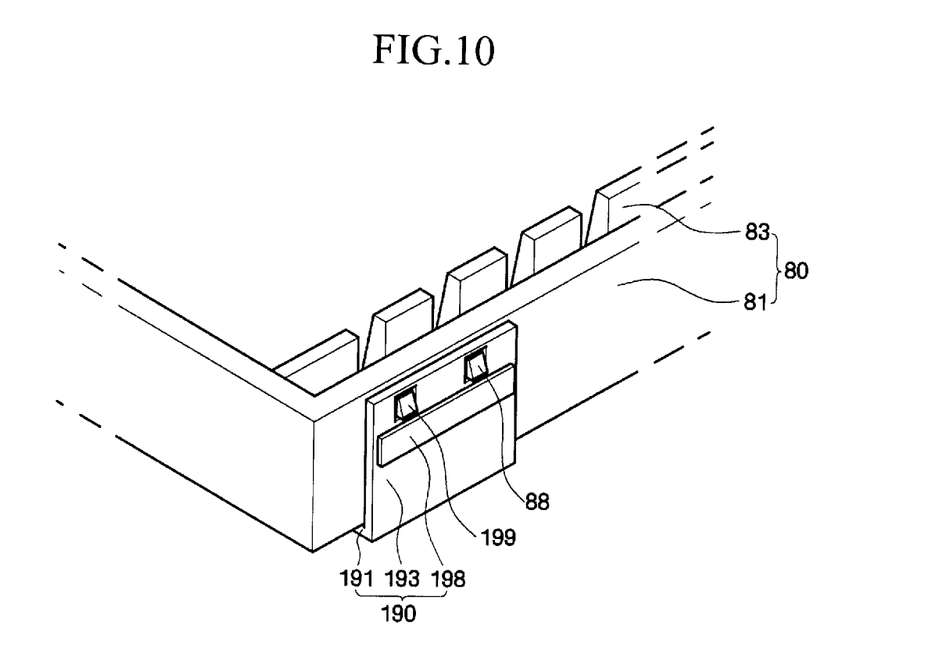
FIG. 10 is a partial perspective view of a ground electrode and a lower receptacle included in the display device of FIG. 7.
Figure 11:
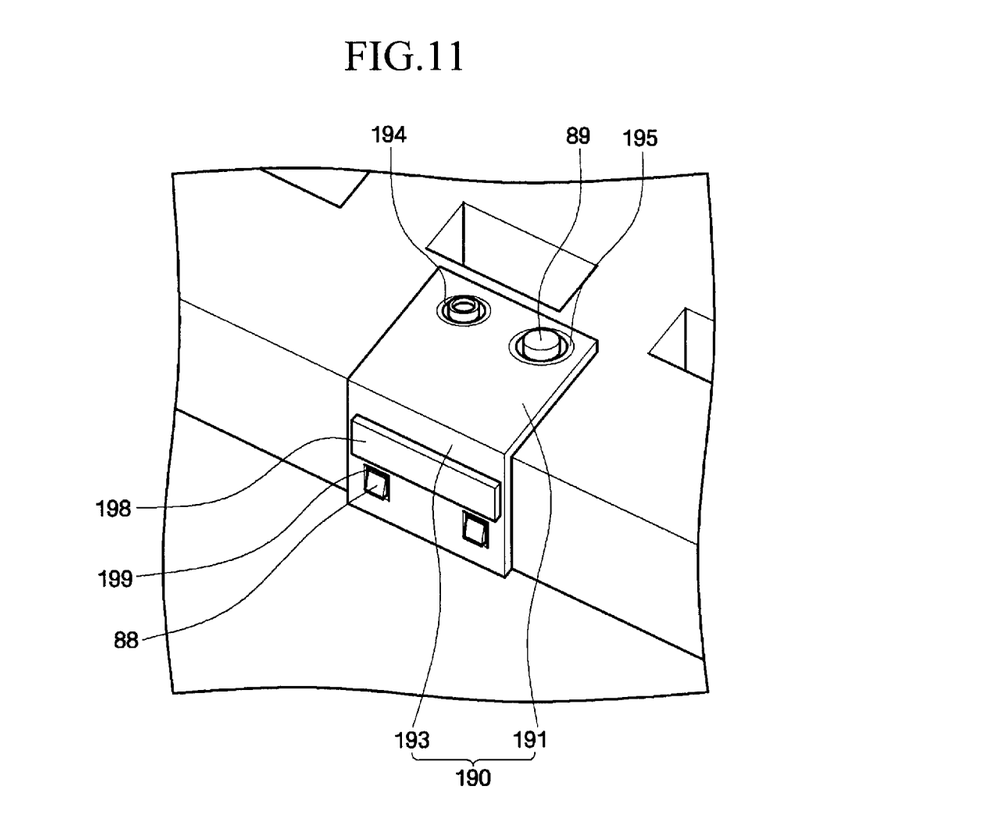
FIG. 11 is a partial perspective view of bottom parts of a ground electrode and a lower receptacle included in the display device of FIG. 7.

FIGS. 7 and 11 illustrate a display device according to a second embodiment of the present invention. FIG. 7 is an exploded perspective view of the display device, and FIG. 8 is a perspective view of a cross-sectional part of the display device of FIG. 7. FIG. 9 is a perspective view of a ground electrode included in the display device of FIG. 7, FIG. 10 is a partial perspective view of the ground electrode and a lower receptacle included in the display device of FIG. 7, and FIG. 11 is a partial perspective view of bottom parts of the ground electrode and the lower receptacle included in the display device of FIG. 7. For convenience of explanation, the same drawing reference numerals are used for the same elements as in the first embodiment, and redundant description of such elements will be avoided.

In the display device 1' according to the second embodiment of the present invention, the ground electrode 190 is attached to an outside of the lower receptacle 80, and is used to ground the upper receptacle 10 as the upper receptacle 10 is coupled to the lower receptacle 80.

Referring to FIGS. 7 and 8, the ground electrode 190 is arranged on the outside of the lower receptacle 80. Specifically, the ground electrode 190 is formed along the side-wall part 82 and the bottom part 81 of the lower receptacle 80. The ground electrode 190 includes a horizontal part 191 and a vertical part 193. The horizontal part 191 is positioned below the bottom part 81 of the lower receptacle 80, and the vertical part 193 is positioned on the side-wall part 82. The ground electrode 190 may be formed to somewhat project outward from the side-wall part 82 of the lower receptacle 80.

The upper receptacle 10 is in physical contact with the vertical part 193 of the ground electrode 190 and thus is electrically connected to the ground electrode 190.

Referring to FIG. 9, the horizontal part 191 and the vertical part 193 of the ground electrode 190 meet at the right angle. The ground electrode 190 may be formed by bending a conductive plate. A first fixing hole 194 (FIG. 11) and a second fixing hole 195 are formed in the horizontal part 191, and a conductive contact part 198 is formed on the vertical part 193.

The conductive contact part 198 serves to reduce the contact resistance and increase the reliability of the electrical contact between the ground electrode 190 and the upper receptacle 10. The conductive contact part 198 may be in the form of a band (a strip) and may be formed on the vertical part 193 in parallel to the top and bottom edges of the side-wall part 82. However, the band shape is merely exemplary, and the conductive contact part 198 may have other shapes, e.g. may cover much of the front surface of the vertical part 193 or may be shaped as a point.

The conductive contact part 198 may be formed to have elasticity higher than that of the ground electrode 190 and the upper receptacle 10. The conductive contact part 198 having such elasticity can serve as a buffer between the ground electrode 190 and the upper receptacle 10.

The conductive contact part 198 may be formed as a fabric of a specified elasticity and may include a conductor to electrically interconnect the ground electrode 190 and the upper receptacle 10. Any suitable fabric can be used consistent with the desired elasticity.

Referring to FIGS. 10 and 11, the ground electrode 190 is formed on the outside of the side-wall part 82 of the lower receptacle 80, and is exposed to an outside. The ground electrode 190 may be formed on any one of the side-wall parts 82 of the lower receptacle 80.

On the outer (lower) surface of the bottom part 81 of the lower receptacle 80, a fixing projection 89 is formed which projects outside. The fixing projection 89 is inserted into the second fixing hole 195 formed on the horizontal part 191 of the ground electrode 190. Further, a screw S3 is inserted into the first fixing hole 194 to fasten the ground electrode 190 to the lower receptacle 80. As the screw S3 and the fixing projection 89 are inserted into the first fixing hole 194 and the second fixing hole 195, respectively, the ground electrode 190 can be firmly fixed to the lower receptacle 80.

Further, in some embodiments, the ground electrode 190 may be in hook engagement with the lower receptacle 80. For example, in some embodiments, a fixing protrusion 88 is formed on the side-wall part 82 of the lower receptacle 80, and a fixing groove 199 is formed on the vertical part 193 of the ground electrode to be engaged with the fixing protrusion 88, so that the ground electrode 190 can be fixed to the lower receptacle 80.

Referring again to FIG. 8, the head of the screw S3 for fixing the ground electrode 190 to the lower receptacle 80 may be positioned inside the lower receptacle 80. The screw S3 penetrates the assembly of the ground sockets 62 at one end of the assembly, and connects the ground electrode 190 to the lower receptacle 80. The screw S3 may be made of a metallic material to electrically connect the outer ground electrode 190 to the assembly of the ground sockets 62 in the lower receptacle 80.

The upper receptacle 10 includes a projection part 15 projecting toward the ground electrode 190. The projection part 15 projects toward the ground electrode 190, and comes in physical contact with the ground electrode 190. The projection part 15 may be formed to physically contact the conductive contact part 198 of the ground electrode 190.

The projection part 15 and the conductive contact part 198 can electrically connect the ground electrode 190 to the upper receptacle 10 even without a separate coupling.

The display device 1' is assembled in such a manner that the lamps 60, the diffusion plate 50, the optical sheet 40, and the like, are accommodated in the lower receptacle 80; the display panel 20 is put in place after coupling the intermediate frame 30 to the lower receptacle; and then the upper receptacle 10 is coupled to the lower receptacle 80. In such embodiment, as the upper receptacle 10 is vertically coupled to the lower receptacle 80, the ground electrode 190 and the upper receptacle 10 become electrically connected together. Accordingly, in the assembling process, the electrical connection is simultaneously made without any separate connection means. The assembly efficiency is therefore increased.

Figure 12:
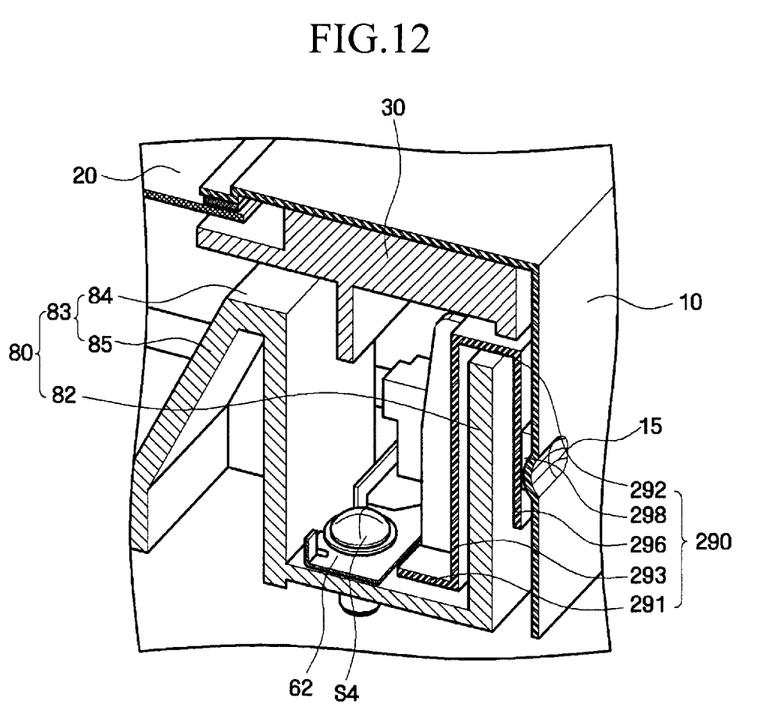
FIG. 12 is a perspective view of a cross-sectional part of a display device according to a third embodiment of the present invention.
Figure 13:
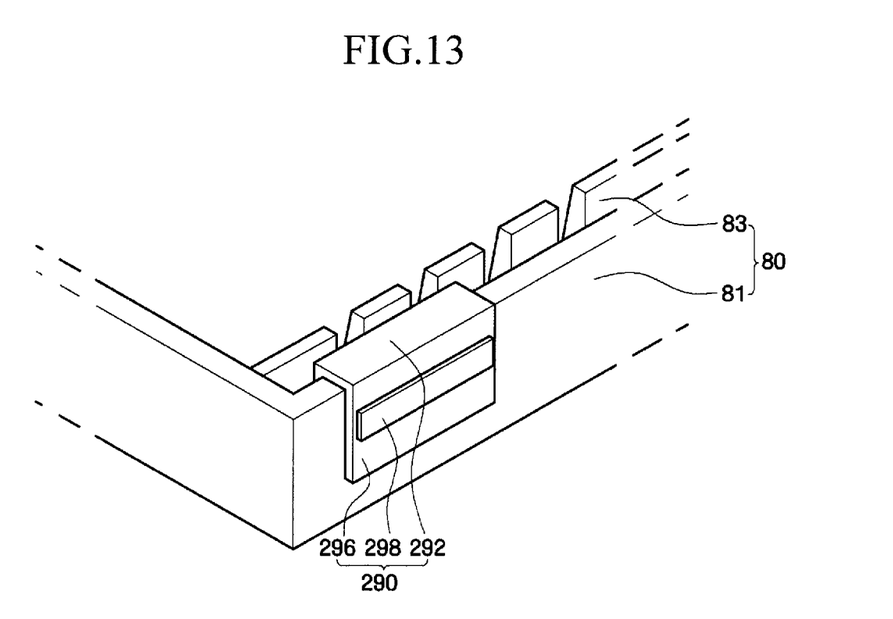
FIG. 13 is a partial perspective view of a ground electrode and a lower receptacle included in the display device of FIG. 12.
Figure 14:
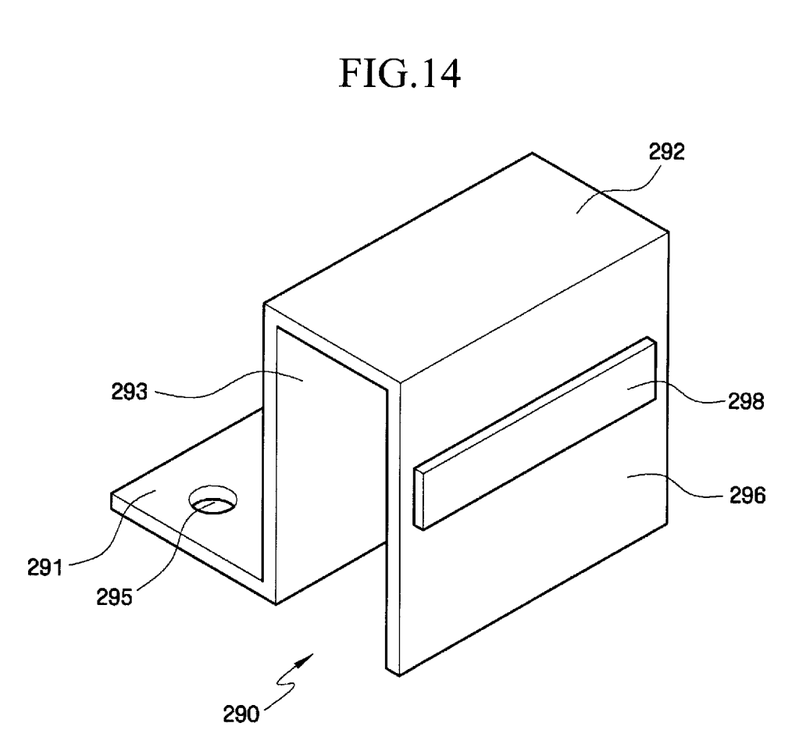
FIG. 14 is a perspective view of a ground electrode included in the display device of FIG. 12.

FIGS. 12 to 14 illustrate a display device according to a third embodiment of the present invention. FIG. 12 is a perspective view of a cross-sectional part of the display device according to the third embodiment. FIG. 13 is a partial perspective view of a ground electrode and a lower receptacle included in the display device of FIG. 12, and FIG. 14 is a perspective view of the ground electrode included in the display device of FIG. 12. For convenience of explanation, the same drawing reference numerals are used for the elements common with the first embodiment, and redundant description of such elements will be avoided.

In the display device according to the third embodiment of the present invention, a ground electrode 290 is attached to an inner side and an outer side of the side-wall part 82 of the lower receptacle 80, and is used to ground the upper receptacle 10 as the upper receptacle 10 is coupled to the lower receptacle 80.

Referring to FIGS. 12 and 13, the ground electrode 290 is formed along the side-wall part 82 and the bottom part 81 of the lower receptacle 80. The ground electrode 290 includes a first horizontal part 291, a first vertical part 293, a second horizontal part 292, and a second vertical part 296.

The first horizontal part 291 is positioned on the inner side of the bottom part 81 of the lower receptacle 80, the first vertical part 293 is positioned on the inside of the side-wall part 82, the second horizontal part 292 is positioned on the upper surface of the side-wall part 82, and the second vertical part 296 is positioned on the outside of the side-wall part 82. The ground electrode 290 may be formed to somewhat project outward from the side-wall part 82 of the lower receptacle 80.

The inner surface of the upper receptacle 10 is in physical contact with the second vertical part 296 of the ground electrode 290 and thus is electrically connected to the ground electrode 290.

Referring to FIG. 14, the first horizontal part 291 and the first vertical part 293 of the ground electrode 290 meet at the right angle, the first vertical part 293 and the second horizontal part 292 meet at the right angle, and the second horizontal part 292 and the second vertical part 296 meet at the right angle. The ground electrode 290 may be formed by bending a conductive plate. The first vertical part 293 and the second vertical part 296 are parallel to each other, and the side-wall part 82 is positioned between the first vertical part 293 and the second vertical part 296. Thus, the gap between the first vertical part 293 and the second vertical part 296 may be as wide as the thickness of the side-wall part 82.

Further, a conductive contact part 298 is formed on the second vertical part 296.

The conductive contact part 298 serves to reduce the contact resistance and increase the reliability of the electrical contact between the ground electrode 290 and the upper receptacle 10. The conductive contact part 298 may be in the form of a band, and may be formed on the second vertical part 296 in parallel to the top and bottom edges of the side-wall part 82. However, the band shape is merely exemplary, and the conductive contact part 298 may have other shapes on the outer surface of the second vertical part 296, e.g. may cover the whole outer surface of the second vertical plate 296 or may be shaped as a point.

Referring again to FIG. 12, a screw S4 fastens the ground electrode 290 to the lower receptacle 80, and may have a head positioned inside the lower receptacle 80. The screw S4 penetrates the assembly of the ground sockets 62 at one side of the assembly, and connects the ground electrode 290 to the lower receptacle 80. The screw S4 may be made of a metallic material to electrically connect the ground electrode 290 to the ground sockets 62 in the lower receptacle 80.

Further, the upper receptacle 10 includes a projection part 15 projecting toward the ground electrode 290. The projection part 15 projects toward the ground electrode 290, and is in physical contact with the ground electrode 290. In such embodiments, the projection part 15 may be formed to physically contact the conductive contact part 298 of the ground electrode 290.

The embodiments described above illustrate but do not limit the present disclosure of invention. Other embodiments are within the scope of the present teachings.

What is claimed is:

1. A display device comprising:
a display panel configured to display an image;
one or more light sources configured to provide light to the display panel;
a lower receptacle including a one piece electrically insulative material formed to define the lower receptacle as having a bottom wall part and side-wall parts surrounding and integrally extending from the bottom wall part, the bottom wall part and the side-wall parts defining a walled interior space into which the light sources may be received;
an upper receptacle disposed above and coupled to the lower receptacle, the upper and lower receptacles containing therebetween the display panel and the light sources; and
a ground electrode physically contacting the lower receptacle and electrically connected to each said light source.

2. The display device of claim 1, further comprising one or more ground sockets each of which physically contacts one terminal of a respective one of the one or more light sources, wherein the one or more ground sockets are electrically connected to the ground electrode.

3. The display device of claim 2, wherein the ground electrode is attached to the one or more ground sockets by at least a screw.

4. The display device of claim 2, wherein the ground electrode comprises a first horizontal part and a second horizontal part which are parallel to the bottom wall part, and comprises a vertical part interconnecting the first horizontal part and the second horizontal part.

5. The display device of claim 4, wherein the first horizontal part is fixed to the bottom wall part, and the second horizontal part physically contacts the upper receptacle.

6. The display device of claim 1, wherein the one piece electrically insulative material of the lower receptacle is formed by molding.

7. The display device of claim 1, wherein the upper receptacle is formed of a conductive material.

8. The display device of claim 7, wherein the ground electrode is fixed to the upper receptacle by at least a screw.

9. The display device of claim 1, wherein at least a part of the ground electrode is positioned between one side-wall part and the upper receptacle.

10. The display device of claim 9, wherein the ground electrode comprises a conductive contact part that is in physical contact with the upper receptacle.

11. The display device of claim 10, wherein the conductive contact part has elasticity higher than that of the ground electrode and higher than that of the upper receptacle.

12. The display device of claim 10, wherein the conductive contact part comprises a fabric and a conductor.

13. The display device of claim 10, wherein the upper receptacle comprises a projection part projecting toward the ground electrode, and being in physical contact with the ground electrode.

14. The display device of claim 13, wherein the projection part is in physical contact with the conductive contact part.

15. The display device of claim 10, wherein the conductive contact part projects toward the upper receptacle.

16. The display device of claim 9, wherein the ground electrode comprises a first horizontal part formed along the bottom wall part, and a first vertical part formed along one side-wall part.

17. The display device of claim 16, wherein the ground electrode extends along an outer surface of the lower receptacle.

18. The display device of claim 16, wherein the ground electrode further comprises a second horizontal part formed on the side-wall part and extending from the first vertical part, wherein the first vertical part and the first horizontal part are on an inside of the lower receptacle, and wherein the ground electrode further comprises a second vertical part connected to the second horizontal part and formed along an outer surface of the side-wall part.

19. The display device of claim 16, wherein the first horizontal part is fixed to the bottom wall part by at least a screw.

20. The display device of claim 19, wherein the lower receptacle further comprises fixing projections, and the ground electrode further comprises fixing holes into which the fixing projections are inserted.

* * * * *